(No Model.)

T. H. MACDONALD.
DEVICE FOR TURNING VEHICLES OUT OF CAR TRACKS.

No. 305,610. Patented Sept. 23, 1884.

Witnesses,
Geo. H. Strong.

Inventor,
T. H. Macdonald
By Dewey & Co
attorneys

UNITED STATES PATENT OFFICE.

THEODORE H. MACDONALD, OF SAN FRANCISCO, CALIFORNIA.

DEVICE FOR TURNING VEHICLES OUT OF CAR-TRACKS.

SPECIFICATION forming part of Letters Patent No. 305,610, dated September 23, 1884.

Application filed June 20, 1884. (No model.)

*To all whom it may concern:*

Be it known that I, THEODORE H. MACDONALD, of the city and county of San Francisco, and State of California, have invented an Improvement in Turning Vehicles out of Car-Tracks; and I hereby declare the following to be a full, clear, and exact description thereof.

My invention relates to a device by which the wheels of vehicles may be easily directed out from the channel in street-car tracks where they may have been traveling, this being effected without straining or injuring the wheel.

It consists of a plate supported by a radial arm or mechanism surrounding the hub of one or more of the wheels. This plate projects beyond the face of the tire or rim of the wheel and at a little distance from it when out of action, but in such position that when turned down the wheel may run over it, and it raises the wheel at the instant that the turn is made, so that it is lifted out of the channel in the car-track, passing on to the other portion of the road-bed without straining the wheel.

Figure 1:
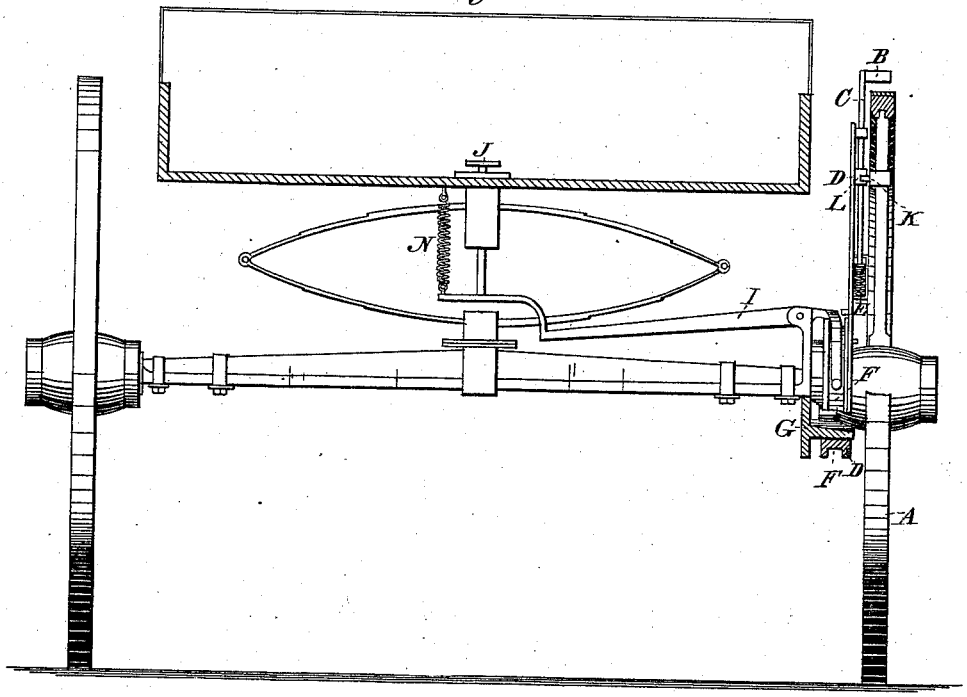
Figure 2:
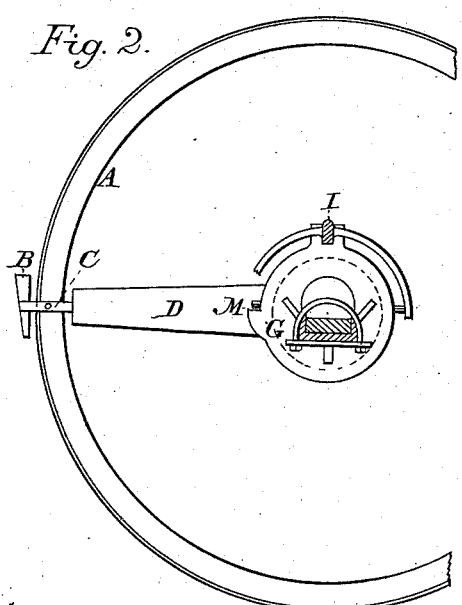
Figure 3:
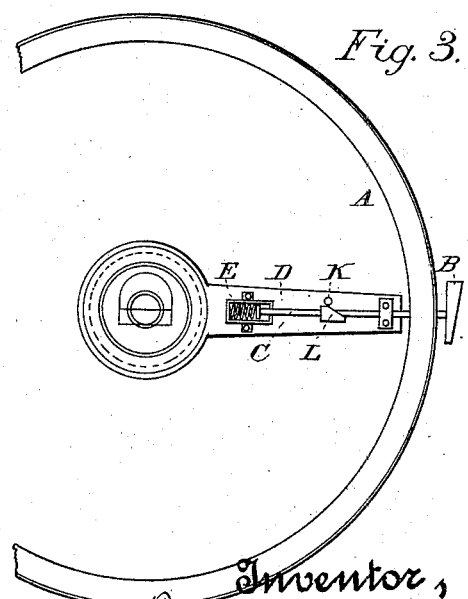

Referring to the accompanying drawings for a more complete explanation of my invention, Figure 1 is a view of the vehicle, showing one wheel with my attachment fixed to it. Figs. 2 and 3 are side elevations showing parts of the wheel-rim, the hub, and the attachment.

I have shown my device as applied only to the right-hand front wheel of a vehicle, because vehicles generally turn out to the right, and because the front wheels are the most difficult to take out of the car-track, the others easily following after this has been accomplished. It will be manifest, however, that, if desired, the device may be applied to the other wheels of the vehicle.

A is a vehicle-wheel.

B is a plate made preferably in the form of an inclined plane, and supported by an arm, C, so as to project over the rim of the wheel. The arm C slides radially to and from the hub in guides which are attached to the radius-arm D, and a spring, E, at the inner end, presses against the arm C, forcing it outward, so as to hold the plate B away from the wheel-rim when not needed. The arm D is fixed to a grooved sliding sleeve, F, which is fitted to the periphery of a drum, G, so that it may be moved to or from the wheel by the action of the bell-crank clutch-lever I, which is operated by a rod and pedal, J, within the vehicle and within easy reach of the driver. When the pedal J is depressed, it forces the lever I down, and the portion at right angles thereto, which forms a clutch-lever, acts against the flanges of the sleeve F and presses it toward the wheel. The usual position of the arm D will be parallel with the surface of the ground, so that the plate B will stand in front of the wheel and at a little distance therefrom. It is held in place by a projection from it which engages a lug, M, on the stationary part G.

K is a pin or stud, projecting from one of the wheels, and when the sleeve F has been pressed inward it will be disengaged from the lug M, and the arm D will also be moved toward the wheel far enough for the rod C to come in contact with the stud K. This carries the plate B downward to a point beneath the wheel, which will then run over it and be raised sufficiently to turn easily out of the track. In some cases I fix an inclined plate, L, to the rod C, so that the stud K will strike the inclined surface as it comes around, and thus force the rod C back until the plate B comes in contact with the rim, and is thus carried down beneath the wheel. The stud continues to act upon the arm and carries it around until the plate B comes to the proper stopping-place, when, the pedal J being released, the spring N will draw the lever I up and move the sleeve back with its arm until it is out of contact with the stud K, when the wheel will revolve freely without contact with this mechanism until again needed.

Having thus described my invention, what I claim as new, and desire to secure by Letters Patent, is—

1. The block B, supported upon the rod C, which slides radially toward the wheel-center, a supporting arm or bar, and a spring acting upon the rod C, to hold the plate away from the wheel, substantially as herein described.

2. The radially-sliding rod C, with the plate or block B, projecting over the wheel-rim, the supporting or guiding arm D, with the flanged sleeve F, sliding upon the rim G, the clutch-lever and operating-pedal, and a stud, K, projecting from the wheel, substantially as herein described.

3. The arm D, extending radially inside of the wheel and movable to or from the same by mechanism as shown, the rod C, supporting the plate or block B, and sliding in guides upon the arm D, the spring E, and the inclined plane L, together with the stud K, projecting from the wheel, so as to engage the arm, substantially as herein described.

4. The arm D, with the radially-sliding bar, the plate B, and the sleeve F, with a mechanism by which it may be caused to slide to or from the wheel, together with the stationary lug M, and the corresponding stud or projections from the arm or sleeve, substantially as herein described.

In witness whereof I have hereunto set my hand.

THEODORE H. MACDONALD.

Witnesses:
S. H. NOURSE,
H. C. LEE.